(12) United States Patent
Chong et al.

(10) Patent No.: US 6,425,067 B1
(45) Date of Patent: Jul. 23, 2002

(54) SYSTEMS AND METHODS FOR IMPLEMENTING POINTER MANAGEMENT

(75) Inventors: Simon Chong, Fremont; Rex Shieh, Milpitas, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/340,282

(22) Filed: Jun. 25, 1999

Related U.S. Application Data

(60) Provisional application No. 60/090,939, filed on Jun. 27, 1998.

(51) Int. Cl.[7] ............................................. G06F 12/00
(52) U.S. Cl. .................... 711/220; 711/213; 711/217
(58) Field of Search ................... 711/3, 220, 213, 711/217; 717/4; 341/106

(56) References Cited

U.S. PATENT DOCUMENTS

| 4,700,294 | A | * | 10/1987 | Haynes | 341/106 |
| 5,640,399 | A | | 6/1997 | Rostoker et al. | 370/392 |
| 5,726,985 | A | | 3/1998 | Daniel et al. | 370/382 |
| 5,867,712 | A | * | 2/1999 | Shaw et al. | 717/4 |
| 5,875,173 | A | | 2/1999 | Ohgane et al. | 370/230 |
| 5,943,693 | A | * | 8/1999 | Barth | 711/220 |

* cited by examiner

Primary Examiner—David Hudspeth
Assistant Examiner—Fred F. Tzeng
(74) Attorney, Agent, or Firm—Blakely, Sokoloff, Taylor & Zafman LLP

(57) ABSTRACT

A system and method of compressing memory for efficiently searching the memory. Values are assigned to initial memory locations and these values are logically combined to form a first group of values. This first group of values are then entered into memory locations and logically combined to form a second group of values. The second group of values are then entered into their own memory locations. By searching the second group of values, it can be determined which of the first group of values includes an initial memory location having a desired logic value.

5 Claims, 3 Drawing Sheets

SYSTEMS AND METHODS FOR IMPLEMENTING POINTER MANAGEMENT

CROSS-REFERENCES TO RELATED APPLICATIONS

This application claims priority from U.S. Provisional Patent Application Ser. No. 60/090,939, entitled "NETWORK ACCELERATOR SUBSYSTEM BASED ON SINGLE-CHIP NETWORK PROCESSOR AND INTERFACE PROTOCOL," filed Jun. 27, 1998. This application is related to U.S. patent application Ser. No. 09/271,061, entitled "TWO-DIMENSIONAL QUEUING/DE-QUEUING METHODS AND SYSTEMS FOR IMPLEMENTING THE SAME," filed Mar. 16, 1999.

BACKGROUND OF THE INVENTION

1. Field of the Invention

The present invention relates in general to a memory management system and more particularly, to a memory management system for managing pointers in a network.

2. Description of the Prior Art

The need for faster communication among computers and other systems requires ever faster and more efficient networks. Today, networks typically use an amalgam of various software and hardware to implement a variety of network functions and standards. Network devices such as client computer systems, servers, hubs, routers, switches, network backbones, etc., are each complex devices that require digital processing in hardware and software to facilitate network communication. Some tasks performed in a network device include translation between different network standards such as Ethernet and ATM, reformatting data, traffic scheduling, routing data cells, packets messages, etc. Depending on the particular protocol being implemented, some tasks may be performed at different points in the network.

In conventional networking systems that implement ATM, data traffic is handled by a Virtual Channel, or Virtual Connection (VC). There are typically many VCs in each system and each VC has its own characteristics, such as packet type, packet size and protocols. For each VC, a descriptor which identifies the particular VC and its characteristics and requirements is stored in a memory. When a scheduler determines that a particular VC is ready for transmission, the VC descriptor is accessed and processed to determine the appropriate characteristics and requirements for cell transmission on the particular connection.

Pointers are generally used within these networking systems for accessing the memory. In order to improve overall performance and speed of the systems, efficient management dictates that available pointers be located as quickly as possible.

SUMMARY OF THE INVENTION

A system for managing a pointer system that includes a plurality of pointers in accordance with the present invention includes at least one memory device wherein each pointer is assigned an address in the memory device and each address has a first value when its corresponding pointer is not in use and a second value when its corresponding pointer is in use. The system further includes logic for combining the values into a first group of values wherein each of the first group of values is assigned to an address in the memory device. Additionally, the system includes logic for combining the first group of values into a second group of values wherein each of the second group of values is assigned to an address in the memory device.

In accordance with a method of managing a pointer system in accordance with the present invention, a memory address for each pointer is assigned and a value is assigned to each memory address based upon whether or not the corresponding pointer is occupied or not. In one preferred embodiment, the value assigned to the memory address if the corresponding pointer is occupied is a logic 0. The values assigned to each memory address are then ORed, preferably within rows of the memory device. Thus, each row would then have a value based upon the ORing function. Each row value is then entered into an address location within the memory device. These first group of values are then also ORed. In a preferred embodiment, the ORing is within rows of the memory device to arrive at a second group of values, which may be referred to as areas. This second group of values or area values are then entered either into memory locations within the memory device or, in a preferred embodiment, into flip-flops.

Thus, in order to efficiently find an available pointer, the area values are evaluated until a logic 1 is located thus indicating that at least one of the rows within that particular area includes a logic 1. The corresponding area is then searched until a row is located whose memory address has a logic 1 value, thus indicating that one of the pointer addresses within that row has a logic 1 value. The corresponding row is then searched until a memory address having a logic 1 is located indicating that that particular pointer is available.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
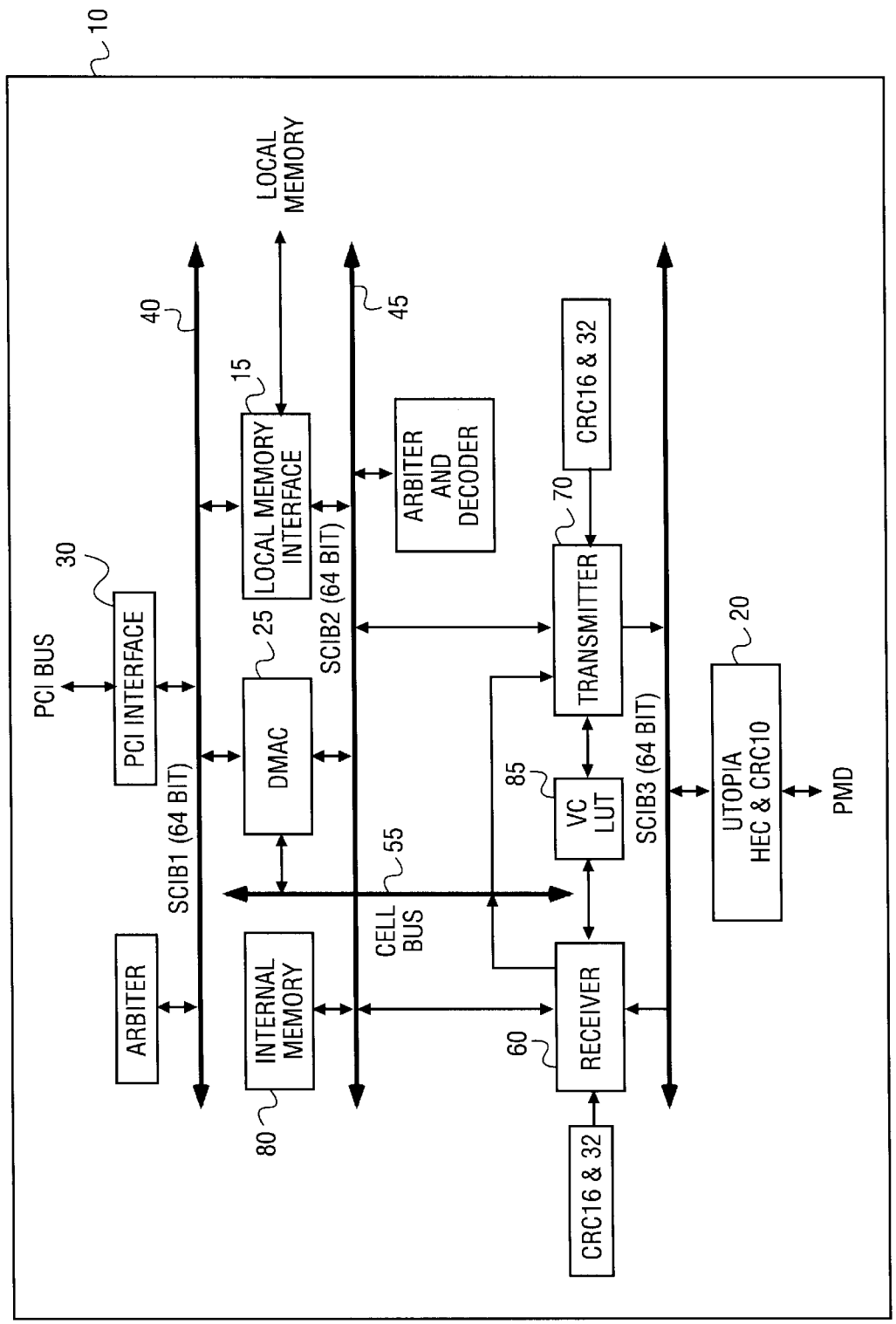
FIG. 1 is a block diagram of the architecture of a network processing engine according to the present invention.

FIG. 1 is a block diagram of the architecture of a network processing engine 10 according to the present invention. In preferred aspects, the network processing engine of the present invention is useful for a variety of network communications applications including implementation in multi-protocol network interface cards (NICs), server NICs, workgroup, IP and ATM switches, multi-protocol and IP routers, ATM backbone switch applications, multi-protocol and multi-protocol /ATM adapters and the like. In preferred aspects, all components of processing engine 10 reside on a single chip (e.g., a single silicon chip), but all components may be spread across many chips such that processing engine 10 is implemented using many chips.

Processing engine 10 includes a local memory interface block 15, UTOPIA interface 20, Direct Memory Access Controller (DMAC) 25, PCI interface 30, first internal bus 40, second internal bus 45, third internal bus 50, and cell bus 55. Processing engine 10 also includes an internal memory 80 and a receiver block 60 and a transmitter block 70 for processing incoming and outgoing data transmissions, respectively, over a communications interface, such as UTOPIA interface 20. Local memory interface block 15 provides a connection to a local, off-chip system memory, such as DRAM, SRAM, SDRAM, SSRAM or any combination thereof. DMAC 25 provides control of data transfers between external memories (PCI), internal memory 80 and the local memory. Internal memory 80 is used in one embodiment to store VC descriptors on-chip for fast access of the VC descriptors. Additionally, in one embodiment, internal memory 80 stores allowed cell rate (ACR) and minimum cell rate (MCR) bitmaps to provide enhanced ABR traffic scheduling capabilities.

PCI interface 30 provides a connection to external intelligence, such as a host computer system, and external packet memories. First and second internal buses 40 and 45 in one embodiment are non-multiplexed 32 bit address and 64 bit data buses. Depending on the desired line rate, PCI interface 30 is configured to run at frequencies up to 33 MHz over a 32 bit PCI bus, or at frequencies up to 66 MHz over a 64 bit PCI bus. For example, to achieve a 622 Mbps line rate, a 64 bit interface is used with frequencies up to 66 MHz. UTOPIA interface 20 supports connections to a broad range of layer 1 physical interfaces, including, for example, OC-1, OC-3, OC-12, OC-48, OC-192 and DS-3 interfaces and the like. To support a 622 Mbps line rate, the UTOPIA data bus is 16 bits, whereas for a 155 Mbps line rate the UTOPIA bus is 8 bits. Third internal data bus 50 is an 8 or 16 bit UTOPIA compatible interface. Cell bus 55 is a 64 bit data path and is used to transfer cells or frames between internal cell/frame buffers of receiver block 60 and transmitter block 70 and the PCI memory space through DMAC 25. Cell bus 55 allows several transactions to occur in parallel. For example, data payload transfers and descriptor data movement may occur simultaneously. Additionally, for a 622 Mbps line rate, cell bus 55 is capable of off-loading up to 160 MBps of bandwidth from local memory.

In accordance with the present invention, a method of compressing memory for efficiently searching the memory is disclosed. As those skilled in the art will understand, while the system and method is particularly well suited for use with internal memory 80 and is described as such for managing pointers therein, the system and method for compressing memory also has other applications.

Figure 2:
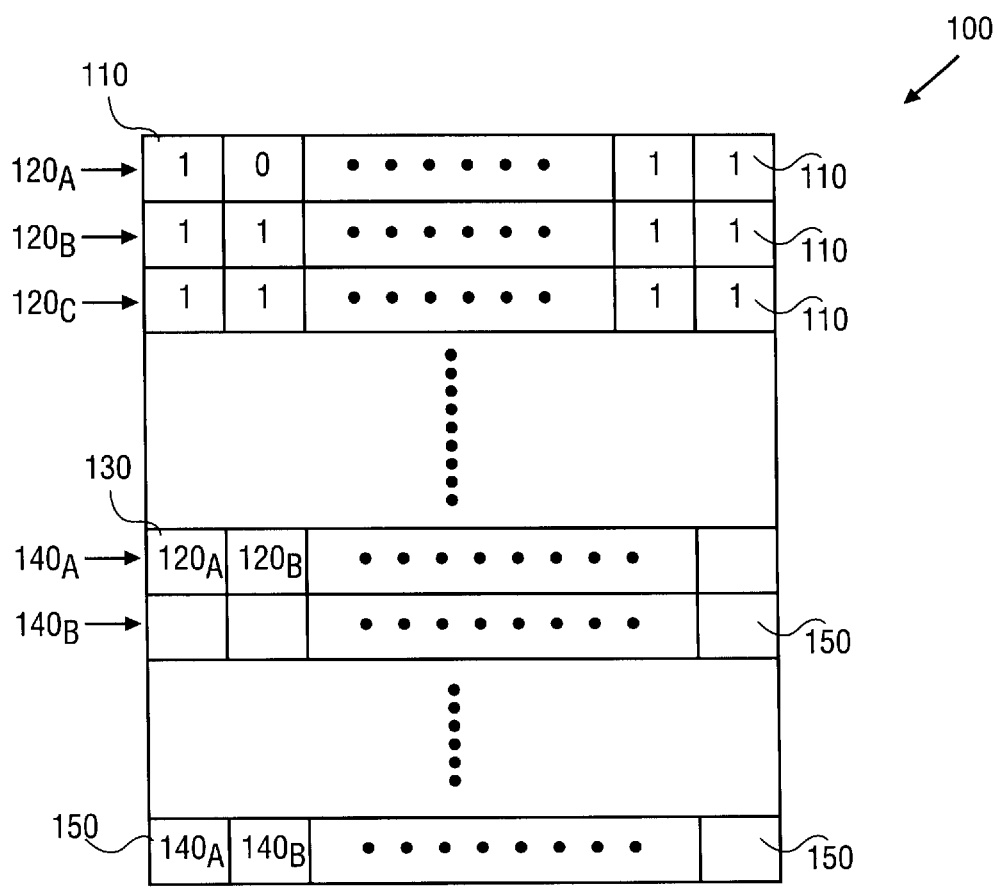
FIG. 2 is a schematic illustration of a pointer management system in accordance with the present invention.
Figure 2:
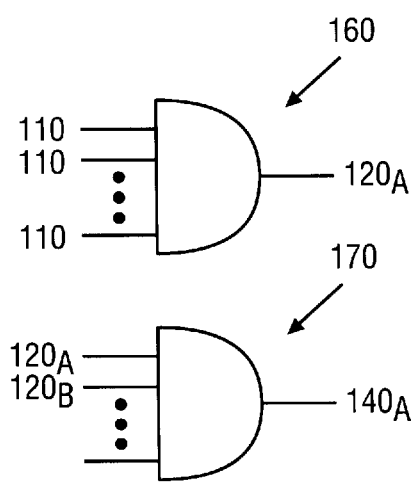

With reference to FIG. 2, at least one memory device 100 is provided. In a preferred embodiment, the size of the memory device is 512 bits by 64 bits. Within internal memory 80 are a plurality of pointers. Each pointer is assigned an address 10 within the memory device. Each row 120 that includes an address or location 110 for pointers is then subsequently assigned a memory location 130 within the memory device. Each row 140 that includes a memory address or location 130 for rows 120 is then likewise assigned a memory address or location 150 either within the memory device or, in a preferred embodiment, at a flip-flop.

If a pointer is occupied or not available, its corresponding memory location 110 is, in one preferred embodiment, assigned a logic 1. If a pointer is available or not occupied, then its corresponding address location 110 is assigned a logic 0. In this preferred embodiment, each memory address 110 within each row 120 is then logically combined by ANDing the values within the row as shown at 160. The row's value is then entered into its corresponding memory location 130. Each row 140 of row values is then also logically combined by ANDing the values as shown at 170. These values are then entered into their corresponding memory locations 150.

Figure 3:
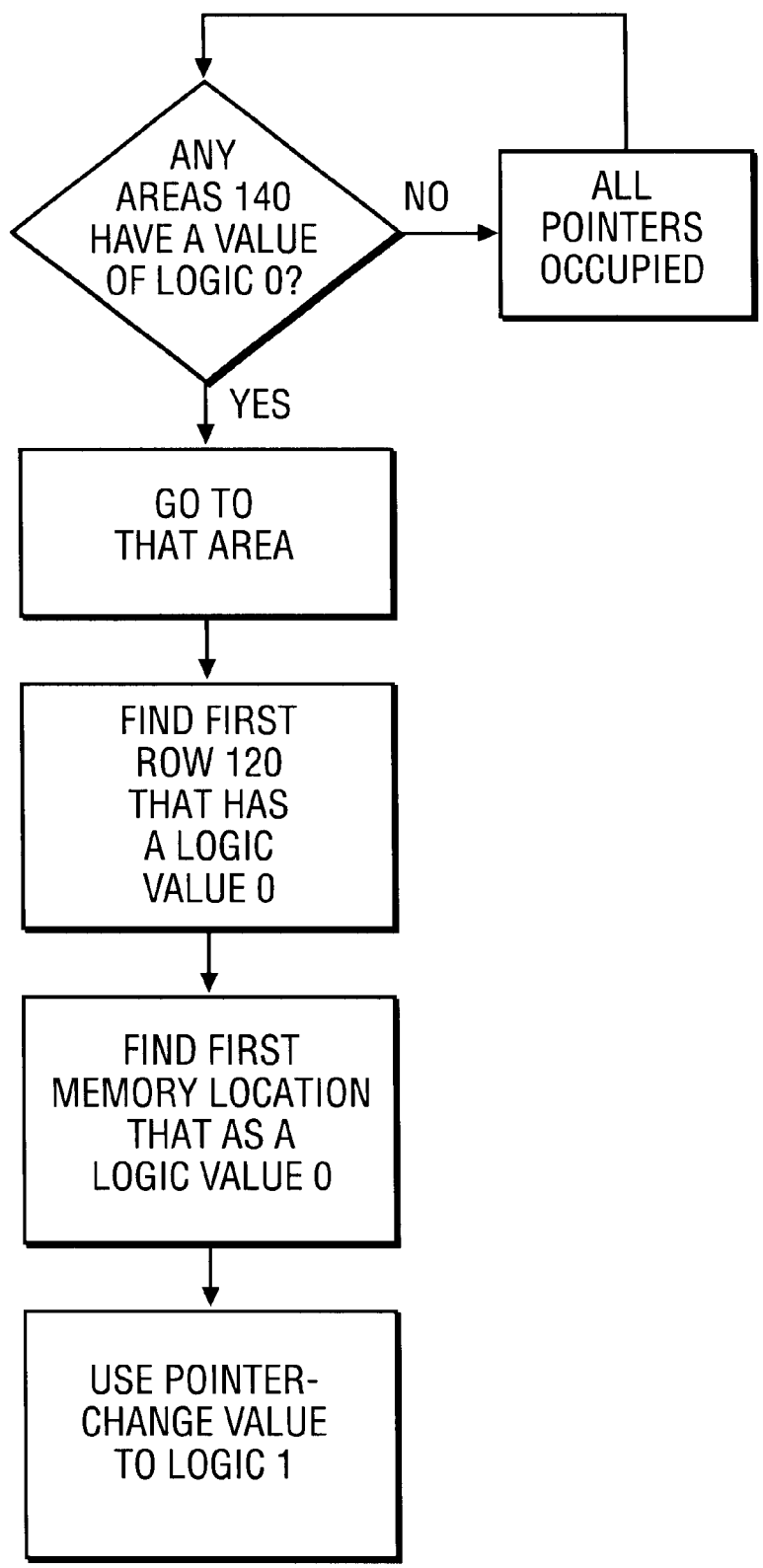
FIG. 3 is a flowchart illustrating a method of pointer management in accordance with the present invention.

Accordingly, with reference to FIG. 3, in accordance with the present invention, when processing engine 10 requires a pointer, the values of the areas 150 are searched until a zero is located, thus indicating that at least one of the rows 120 associated with that area has a value of zero. That area is then searched until a row value of logic 0 is located, thus indicating that that row contains at least one pointer location 110 having a value of logic 0. That row is then searched until a pointer location having a logic value of zero is located. The pointer associated with that location is then used by the processing engine and the location's value is changed to logic 1. When processing engine 10 is finished with a pointer, that pointer's location 110 has its value changed to logic 0.

As should be readily apparent to those skilled in the art, different logic values may be used and thus, different logic functions. For example, if a pointer location is occupied or in use, then a logic 0 may be assigned to the pointer's location and if the pointer is available, a logic 1 may be assigned to the pointer's location. In such an embodiment, the values within the rows would then be logically combined by ORing the values. Likewise, the system may be set up to use other logic functions such as NOR functions, exclusive OR functions, etc.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for locating a pointer in a memory comprising:
   searching for one of a plurality of memory locations having a value indicating an area of memory in which is located an available pointer;
   searching for one of a plurality of memory locations having a value indicating a row in the area of memory in which is located an available pointer;
   searching for one of a plurality of memory locations having a value indicating a memory location in the row of the area of memory in which is located the available pointer;
   accessing the available pointer; and setting the value of the memory location corresponding to the available pointer to a value indicating that the pointer is not available.

2. An article of manufacture, comprising:
   a machine accessible medium providing instructions that, when executed by a machine, cause the machine to:
   search for one of a plurality of memory locations having a value indicating an area of the memory in which is located an available pointer;
   search for one of a plurality of memory locations having a value indicating a row in the area of memory in which is located an available pointer;
   search for one of a plurality of memory locations having a value indicating a memory location in the row of the area of memory in which is located the available pointer;

access the available pointer; and
set the value of the memory location corresponding to the available pointer to a value indicating that the pointer is not available.

3. A method comprising:

searching a first block of memory for an entry indicating an area of memory in which is located an available memory pointer;

locating the entry in the first block of memory;

searching a second block of memory, as determined by the entry located in the first block of memory, for an entry indicating a row in the area of memory in which is located an available memory pointer;

locating the entry in the second block of memory;

searching a third block of memory, as determined by the entry located in the second block of memory, for an entry indicating a location in the row in the area of memory in which is located an available memory pointer;

locating the entry in the third block of memory;

accessing the available memory pointer indicated in the entry in the third block; and setting the value of the entry in the third block to indicate that the memory pointer is unavailable.

4. A method comprising:

allocating a memory location, corresponding to a pointer in a memory, in which to store a value indicating whether the pointer is available, for each pointer in the memory;

allocating a memory location, corresponding to a row of memory comprising at least one of the memory locations corresponding to a pointer in a memory, in which to store a value indicating whether a pointer is available, for each such row; and allocating a memory location, corresponding to an area of a memory comprising at least one of the rows of memory locations, in which to store a value indicating whether a pointer is available, for each such area.

5. An article of manufacture, comprising:

a machine accessible medium providing instructions, that when executed by a machine, cause the machine to:

allocate a memory location, corresponding to a pointer in a memory, in which to store a value indicating whether the pointer is available, for each pointer in the memory;

allocate a memory location, corresponding to a row of memory comprising at least one of the memory locations corresponding to a pointer in a memory, in which to store a value indicating whether a pointer is available, for each such row; and allocate a memory location, corresponding to an area of a memory comprising at least one of the rows of memory locations, in which to store a value indicating whether a pointer is available, for each such area.

* * * * *